US012390997B2

(12) United States Patent
Ma

(10) Patent No.: US 12,390,997 B2
(45) Date of Patent: Aug. 19, 2025

(54) GROUND RAIL PRINTER

(71) Applicant: Winsun technology INC., Irvine, CA (US)

(72) Inventor: Yihe Ma, Irvine, CA (US)

(73) Assignee: Winsun technology Inc., Irvine, CA (US)

( * ) Notice: Subject to any disclaimer, the term of this patent is extended or adjusted under 35 U.S.C. 154(b) by 29 days.

(21) Appl. No.: 18/342,750

(22) Filed: Jun. 28, 2023

(65) Prior Publication Data
US 2025/0001684 A1 Jan. 2, 2025

(30) Foreign Application Priority Data

Jun. 28, 2023 (CN) .......................... 202221626627.4

(51) Int. Cl.
B29C 64/236 (2017.01)
B22F 12/00 (2021.01)
B29C 64/232 (2017.01)
B33Y 30/00 (2015.01)

(52) U.S. Cl.
CPC .......... *B29C 64/236* (2017.08); *B22F 12/222* (2021.01); *B22F 12/224* (2021.01); *B29C 64/232* (2017.08); *B33Y 30/00* (2014.12)

(58) Field of Classification Search
CPC ... B29C 64/227; B29C 64/236; B29C 64/232; B29C 64/245; B29C 64/25; B29C 64/379; B22F 12/222; B22F 12/224; B33Y 30/00
See application file for complete search history.

(56) References Cited

U.S. PATENT DOCUMENTS 3,860,276 A * 1/1975 Lambrecht ................ E05C 1/16
292/DIG. 60
2016/0236407 A1* 8/2016 Armani .................. B29C 64/118

FOREIGN PATENT DOCUMENTS

WO WO-2017080286 A1 * 5/2017 ............. B29C 67/00

OTHER PUBLICATIONS

Translation of WO-2017080286A1, Du may 2017.*

* cited by examiner

*Primary Examiner* — Philip C Tucker
*Assistant Examiner* — Jimmy R Smith, Jr.
(74) *Attorney, Agent, or Firm* — Treasure IP Group, LLC

(57) ABSTRACT

This application discloses a ground rail type printer, which comprises two X-axis guide rails, two Z-axis guide rails, and a Y-axis guide rail. Both X-axis guide rails are equipped with a connector plate installed via a sliding mechanism. The bottom ends of the two Z-axis guide rails are respectively fixed to the tops of the corresponding connector plates by screws. A first rack is installed on the sides of the two X-axis guide rails that are closest to each other. Both connector plates are equipped with X-axis drive assemblies. A sliding support is installed on the two Z-axis guide rails using a sliding mechanism. The two ends of the Y-axis guide rail are respectively fixedly connected to the corresponding sliding support. It facilitates the adjustment of the direction of the printer equipment installed on the printer frame along the X-axis guide rails, the Z-axis guide rails, and the Y-axis guide rail according to printing requirements.

7 Claims, 5 Drawing Sheets

GROUND RAIL PRINTER

CROSS-REFERENCE TO RELATED APPLICATION

The present disclosure claims priority to a Chinese Patent Application No. 202221626627.4, entitled "Ground Rail Printer", filed on Jun. 28, 2022, the entire contents of which is incorporated herein by reference in its entirety.

TECHNICAL FIELD OF INVENTION

The present invention relates to the technical field of 3D printing, in particular to a ground rail printer.

BACKGROUND TECHNOLOGY 3D printing, also known as a type of rapid prototyping technology, is a technique that constructs objects by layer-by-layer printing using adhesive materials like powdered metal or plastic, based on digital model files. 3D printing is usually achieved with digital material printers, often used in mold manufacturing, industrial design, and other fields to make models. Gradually, it has been used for the direct manufacturing of some products, with parts made using this technology. This technology has been applied in jewelry, footwear, industrial design, architecture, engineering, and construction, automotive, aerospace, dental and medical industries, education, geographic information systems, civil engineering, firearms, and other fields. Nowadays, as 3D printing technology matures, the types and functions of 3D printers are becoming increasingly diversified.

However, commonly used 3D printers can only control the printer device to move and adjust in a certain direction, resulting in less precise adjustment of the printing position. The adjustment range is limited and can't control the printing operation smoothly, thus reducing the printing effect and quality. To solve these problems, we propose a ground rail type printer.

SUMMARY OF THE INVENTION

(I) Technical Problem to be Solved

Addressing the shortcoming of the prior art, the present invention provides a ground rail type printer, which solves the problem that when the 3D printer is used, only the printer device can be controlled to move and adjust in specific directional positions, resulting in the printing position adjustment of the printer device is not accurate enough, the adjustment range is limited, and the printing operation cannot be controlled smoothly. Such constraints inevitably lead to a decrease in both the efficiency and quality of the printing outcome.

TECHNICAL SOLUTIONS

To achieve the above purpose, this application provides the following technical solution. A ground rail type printer, comprising two X-axis guide rail assemblies, two Z-axis guide rail assemblies, and a Y-axis guide rail assembly assembly. The two X-axis guide rail assemblies are both equipped with a slidingly mounted connecting plate. The bottom ends of the two Z-axis guide rail assemblies are respectively fixedly mounted on the tops of the corresponding connecting plates by screws. A first rack is fixedly mounted on the sides of the two X-axis guide rail assemblies that are closest to each other. Both connecting plates are equipped with X-axis drive assemblies. Sliding supports are slidingly mounted on the two Z-axis guide rail assemblies. The two ends of the Y-axis guide rail assembly are respectively fixedly connected to the corresponding sliding supports. A printer frame is slidingly mounted on the Y-axis guide rail assembly. The printer frame is equipped with a Y-axis drive assembly. Fixed supports are fixedly mounted on the tops of the two Z-axis guide rail assemblies. Both Z-axis guide rail assemblies are equipped with Z-axis drive assemblies.

Preferably, the X-axis drive assembly comprises a first servo motor, a drive shaft, and a first drive gear. The first servo motor is fixedly mounted on the top of the connecting plate. The drive shaft is rotationally mounted on the connecting plate. The top end of the drive shaft penetrates the connecting plate and is fixedly connected to the output shaft end of the first servo motor. The first drive gear is fixedly mounted at the bottom end of the drive shaft. The first drive gear meshes with the first rack.

Preferably, the bottom of the connecting plate is rotatably mounted with two support rollers. The two support rollers are symmetrically set on both sides of the drive shaft. Both support rollers are in rolling contact with the top of the X-axis guide rail assembly.

Preferably, the bottoms of the two X-axis guide rail assemblies are each installed with multiple channel steel brackets by screws. The multiple channel steel brackets at the bottom of the same X-axis guide rail assembly are arranged at equal intervals.

Preferably, the Y-axis drive assembly comprises a second servo motor, a second drive gear, and a second rack. The second servo motor is fixedly mounted on the left side of the printer frame. The second drive gear is fixedly mounted on the output shaft end of the second servo motor. The second rack is fixedly mounted on the side of the printer frame near the second servo motor. The second drive gear meshes with the second rack.

Preferably, the printer frame comprises two fixed plates, four screws, four positioning rings, and two guide wheels. The two fixed plates are respectively located on both sides of the Y-axis guide rail assembly. The two ends of the screws are respectively installed on the corresponding fixed plates by nuts. The four positioning rings are respectively set on the corresponding screws. The two guide wheels are rotatably installed on the sides of the two fixed plates that are farthest from each other. The two guide wheels are respectively in rolling contact with the two sides of the Y-axis guide rail assembly.

Preferably, the Z-axis drive assembly comprises a third servo motor, a ball screw, a ball nut, and a coupling. Both the third servo motor and the coupling are fixedly installed on the top of the fixed support. The ball screw is rotatably installed on the Z-axis guide rail assembly. The output shaft end of the third servo motor and the top end of the ball screw are respectively connected to the coupling. The sliding support is threadedly connected to the ball screw. The ball nut is installed on the sliding support and is set on the ball screw.

(III) Beneficial Effects

The present application provides a ground rail type printer with the following beneficial effects:

(1) This ground rail type printer, through the use of the X-axis drive assembly connection, can control the two Z-axis guide rail assemblies to slide on the corresponding X-axis guide rail assemblies, thereby controlling the two Z-axis guide rail assemblies, the Y-axis guide rail assembly, the printer frame, and the printer device to move horizontally forward or backward along the direction of the X-axis guide rail assemblies. By using the Y-axis drive assembly connection, the printer frame can be controlled to move horizontally on the Y-axis guide rail assembly, thereby controlling the printer device installed on the printer frame to move horizontally. By using the Z-axis drive assembly connection, the Y-axis guide rail assembly, the printer frame, and the printer device can be controlled to vertically ascend or descend along the Z-axis guide rail assemblies.

(2) This ground rail type printer, by controlling the printer device installed on the printer frame to adjust in the direction of the X-axis guide rail assemblies, Z-axis guide rail assemblies, and Y-axis guide rail assemblies respectively, can precisely adjust the printing position of the printer device. The adjustment range has been increased, allowing for more convenient printing operations, and improving the printing effect and printing quality.

In the FIGURES: 1, X-axis guide rail assembly; 2, Z-axis guide rail assembly; 3, Y-axis guide rail assembly; 4, connection plate; 5, first servo motor; 6, drive shaft; 7, first drive gear; 8, first rack; 9, support roller; 10, channel steel bracket; 11, printer frame; 12, second servo motor; 13, second drive gear; 14, second rack; 15, fixed plate; 16, screw; 17, positioning ring; 18, guide wheel; 19, fixed bracket; 20, third servo motor; 21, sliding bracket; 22, ball screw; 23, ball nut; 24, coupler; 25, U-shaped support plate; 26, pivot shaft; 27, roller; 28, counterweight assembly.

The following will clearly and completely describe the technical solutions in the embodiments of this application in conjunction with the accompanying drawings. Obviously, the described embodiments are only a part of the embodiments of this application, not all of the embodiments. All other embodiments obtained by those skilled in the art without creative work based on the embodiments in this application belong to the scope of protection of this application.

In the description of this application, it needs to be understood that terms such as "length", "width", "up". "down", "front", "back", "left", "right", "vertical", "horizontal", "top", "bottom", "inside", "outside" etc. indicate the position or spatial relationships based on those shown in the figures. They are only for the convenience of describing this application and simplifying the description, and do not indicate or imply that the referred device or element must have a specific orientation, be constructed and operated in a specific orientation. Therefore, they should not be understood as limiting this application. Furthermore, in the description of this application, "multiple" means two or more, unless there is a specific limitation.

Figure 1:
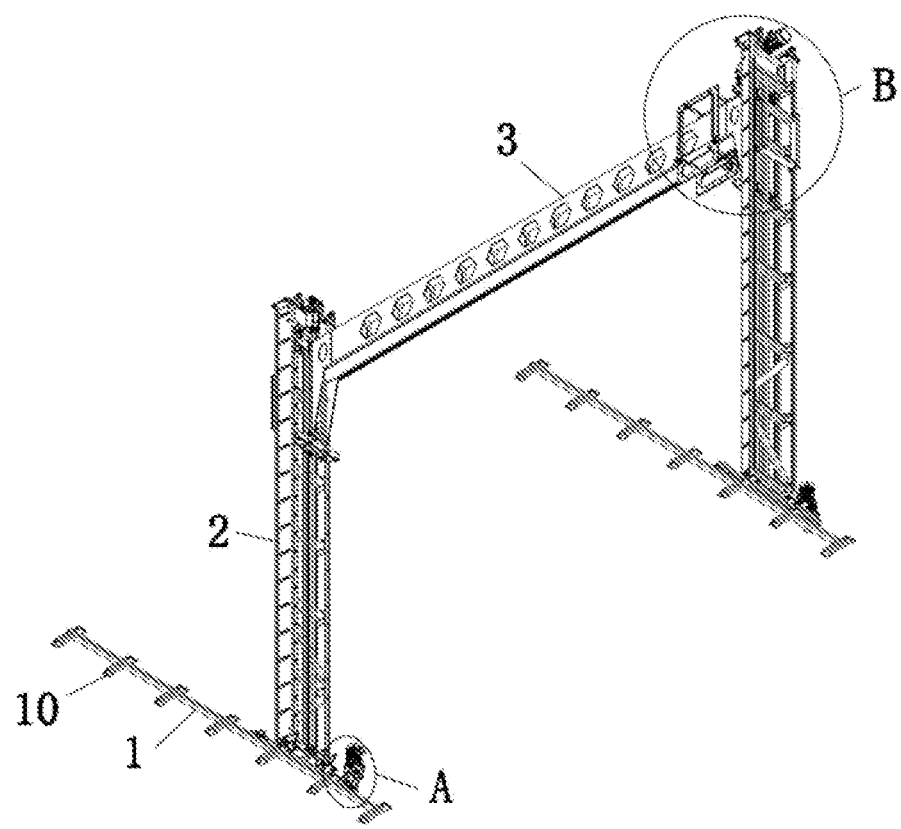
FIG. 1 is a schematic view of the three-dimensional structure of this application.
Figure 2:
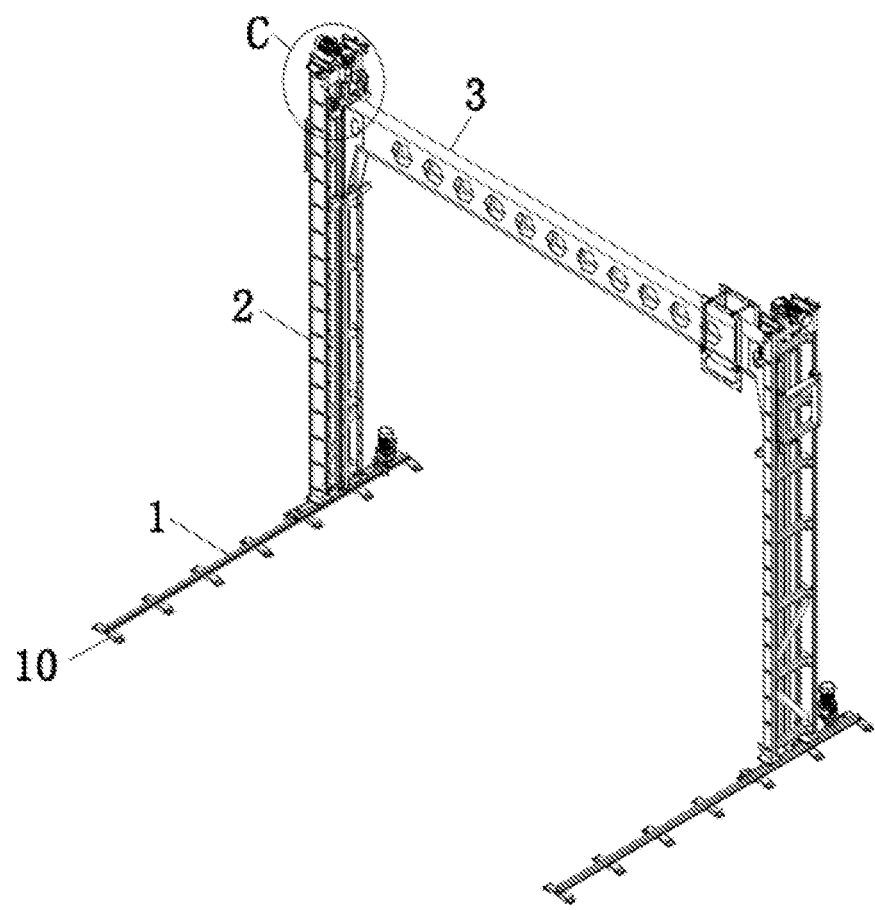
FIG. 2 is a schematic view of the three-dimensional structure of this application from another perspective.
Figure 3:
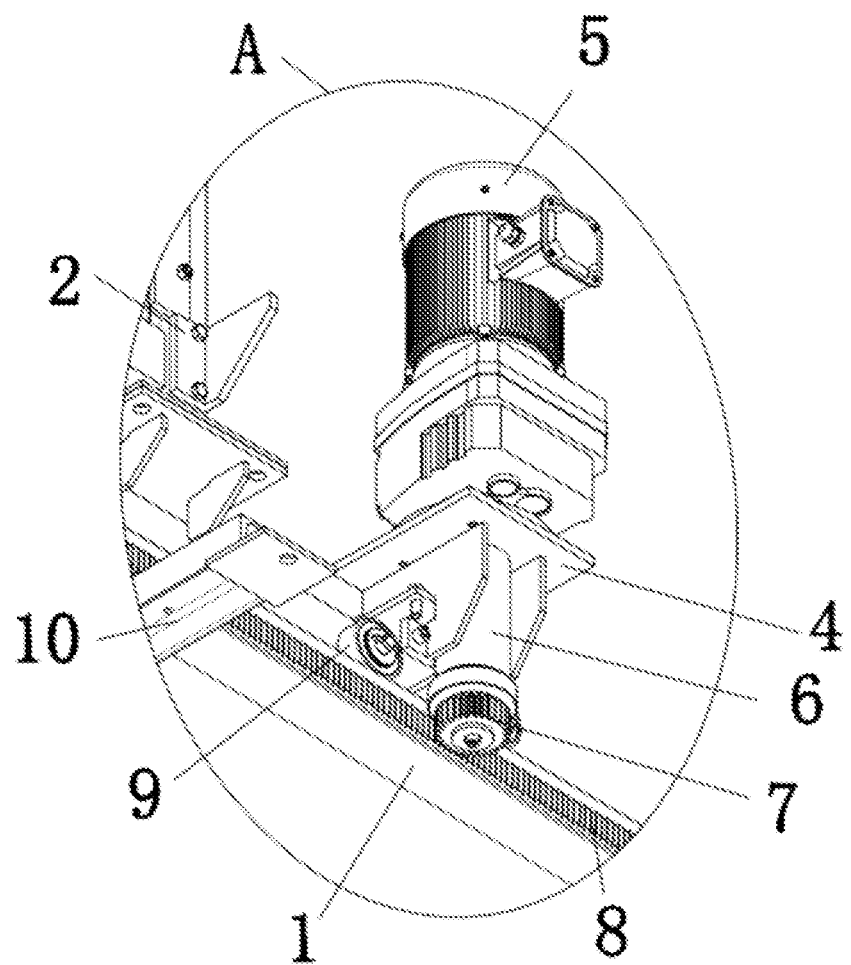
FIG. 3 is an enlarged schematic view of part A in FIG. 1.
Figure 4:
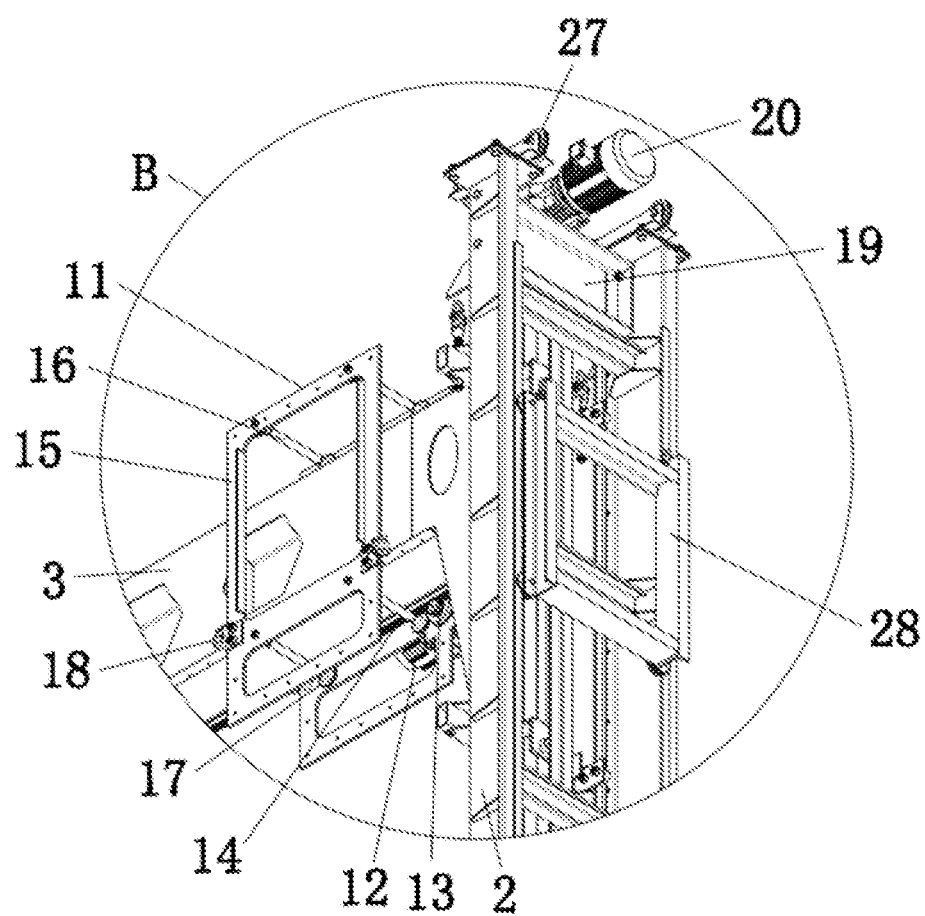
FIG. 4 is an enlarged schematic view of part B in FIG. 1.
Figure 5:
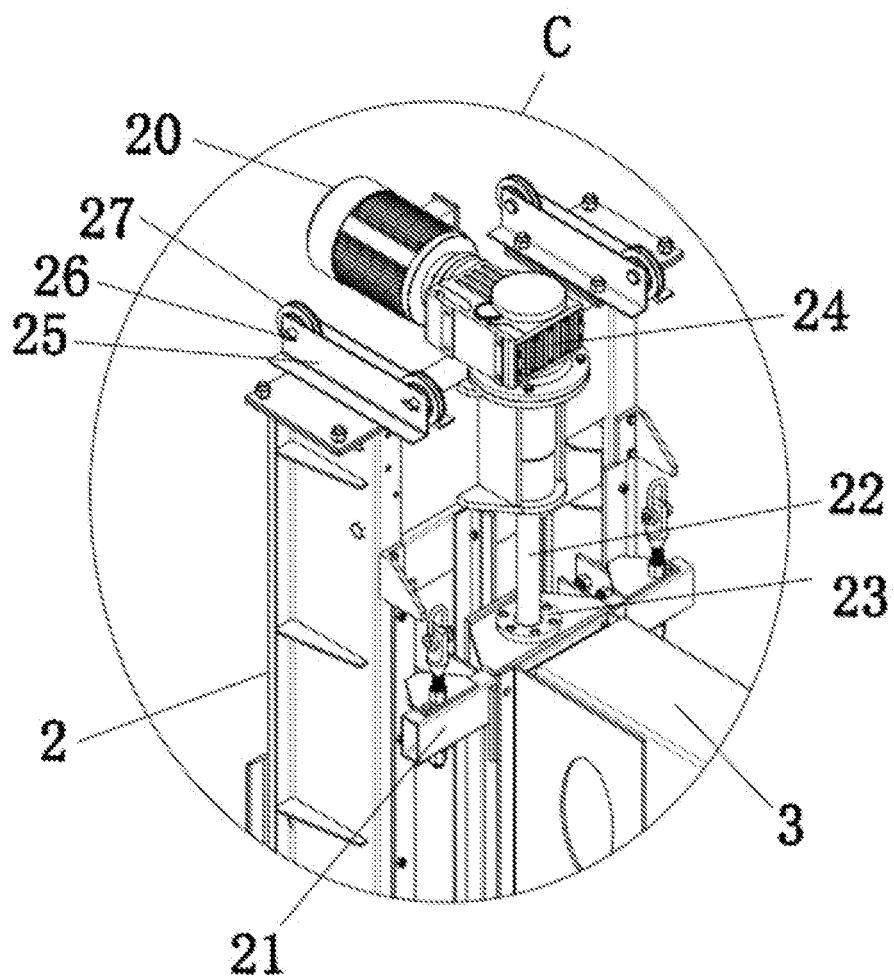
FIG. 5 is an enlarged schematic view of part C in FIG. 2.

As shown in FIGS. 1-5, this application provides a technical solution: a ground rail type printer, comprising two X-axis guide rail assemblies 1, two Z-axis guide rail assemblies 2 and Y-axis guide rail assembly 3. Two connection plates 4 are slidably mounted on the two X-axis guide rail assemblies 1, and the bottom ends of the two Z-axis guide rail assemblies 2 are fixedly mounted on the top of the corresponding connection plates 4 by screws. A first rack 8 is fixedly mounted on the side of the two X-axis guide rail assemblies 1 that are close to each other. X-axis drive assembly are provided on the two connection plates 4. By using the X-axis drive assembly, the two Z-axis guide rail assemblies 2 can be controlled to slide on the corresponding X-axis guide rail assemblies 1, thereby enabling the two Z-axis guide rail assemblies 2 and Y-axis guide rail assembly 3 to move horizontally in the direction of the X-axis guide rail assemblies 1. Sliding brackets 21 are slidably mounted on the two Z-axis guide rail assemblies 2. The two ends of the Y-axis guide rail assembly 3 are fixedly connected with the corresponding sliding brackets 21. The printer frame 11 is slidably mounted on the Y-axis guide rail assembly 3. By using the printer frame 11, it is convenient to mount and fix the printer device on the printer frame 11. The printer frame 11 is provided with a Y-axis drive assembly. By using the Y-axis drive assembly, the printer frame 11 can be controlled to move horizontally on the Y-axis guide rail assembly 3, thereby controlling the horizontal movement of the printer device mounted on the printer frame 11. Fixed brackets 19 are fixedly mounted on the top of the two Z-axis guide rail assemblies 2. Z-axis drive assembly are provided on the two Z-axis guide rail assemblies 2. By using the Z-axis drive assembly, the Y-axis guide rail assembly 3 and the printer frame 11 can be controlled to rise or fall vertically.

In this embodiment, the X-axis drive assembly comprises a first servo motor 5, a drive shaft 6, and a first drive gear 7. The first servo motor 5 is fixedly mounted on the top of the connection plate 4. The drive shaft 6 is rotatably mounted on the connection plate 4. The top end of the drive shaft 6 penetrates the connection plate 4 and is fixedly connected with the output shaft end of the first servo motor 5. The first drive gear 7 is fixedly mounted on the bottom end of the drive shaft 6. The first drive gear 7 meshes with the first rack 8. By using the meshing transmission of the first drive gear 7 and the first rack 8, the connection plate 4 can be controlled to drive the Z-axis guide rail assembly 2 to move horizontally in the direction of the X-axis guide rail assembly 1.

In this embodiment, two support rollers 9 are rotatably mounted on the bottom of the connection plate 4. The two support rollers 9 are symmetrically set on both sides of the drive shaft 6. The two support rollers 9 are both in rolling contact with the top of the X-axis guide rail assembly 1. By using the support rollers 9, the support for the connection plate 4 is provided, allowing the connection plate 4 to slide smoothly and easily on the X-axis guide rail assembly 1.

In this embodiment, multiple channel steel brackets 10 are fixedly mounted on the bottom of the two X-axis guide rail assemblies 1 by screws. The multiple channel steel brackets 10 at the bottom of the same X-axis guide rail assembly 1 are arranged at equal intervals. By setting multiple channel steel brackets 10, the support for the X-axis guide rail assembly 1 is provided, which allows the X-axis guide rail assembly 1 to be stably placed on the ground.

In this embodiment, the Y-axis drive assembly comprises a second servo motor 12, a second drive gear 13, and a second rack 14. The second servo motor 12 is fixedly mounted on the left side of the printer frame 11. The second drive gear 13 is fixedly mounted on the output shaft end of the second servo motor 12. The second rack 14 is fixedly mounted on the side of the printer frame 11 close to the second servo motor 12. The second drive gear 13 meshes with the second rack 14. By using the meshing transmission of the second drive gear 13 and the second rack 14, the printer frame 11 can be controlled to move horizontally along the Y-axis guide rail assembly 3.

In this embodiment, the printer frame 11 comprises two fixed plates 15, four screws 16, four positioning rings 17, and two guide wheels 18. The two fixed plates 15 are located on both sides of the Y-axis guide rail assembly 3. The two ends of the screws 16 are fixedly mounted on the corresponding fixed plates 15 through nuts. Four positioning rings 17 are respectively sleeved on the corresponding screws 16. The two guide wheels 18 are respectively rotatably mounted on the side of the two fixed plates 15 that are far away from each other. The two guide wheels 18 are both in rolling contact with the sides of the Y-axis guide rail assembly 3. By using the combination of the two fixed plates 15, four screws 16, four positioning rings 17, and two guide wheels 18, the printer frame 11 can be conveniently installed and set on the Y-axis guide rail assembly 3, and the printer frame 11 can be controlled to slide smoothly and easily on the Y-axis guide rail assembly 3.

In this embodiment, the Z-axis drive assembly comprises a third servo motor 20, a ball screw 22, a ball nut 23, and a coupler 24. The third servo motor 20 and the coupler 24 are both fixedly mounted on the top of the fixed bracket 19. The ball screw 22 is rotatably mounted on the Z-axis guide rail assembly 2. The output shaft end of the third servo motor 20 and the top end of the ball screw 22 are respectively connected with the coupler 24. The sliding bracket 21 is threadedly sleeved on the ball screw 22. The ball nut 23 is mounted on the sliding bracket 21 and is sleeved on the ball screw 22. By setting up the connection and cooperation of the third servo motor 20, ball screw 22, ball nut 23, and coupler 24, the Y-axis guide rail assembly 3 can be controlled to rise or fall vertically.

In this embodiment, two U-shaped support plates 25 are fixedly mounted on the top of the Z-axis guide rail assembly 2. The two U-shaped support plates 25 are symmetrically set on both sides of the third servo motor 20. Two pivot shafts 26 are fixedly mounted inside each U-shaped support plate 25. Two rollers 27 are respectively rotatably sleeved on the two pivot shafts 26. The two Z-axis guide rail assemblies 2 that are far away from each other are both provided with counterweight assembly 28.

In this embodiment, both the two first servo motors 5, the second servo motor 12, and the two third servo motors 20 use reversible motors. Control switches can be installed at suitable positions on the X-axis guide rail assembly 1 or the Z-axis guide rail assembly 2. The two first servo motors 5, the second servo motor 12, the two third servo motors 20, and the control switches are electrically connected in sequence to form a circuit through wires. The control switches can respectively control the start, stop, and reversing operations of the two first servo motors 5, the second servo motor 12, and the two third servo motors 20.

When in use, the printer device is installed and fixed on the printer frame 11. During the printing process, by starting the two first servo motors 5 to rotate forward or reverse, the two first servo motors 5 respectively drive the corresponding first drive gears 7 to rotate. By using the meshing transmission of the two first drive gears 7 and the corresponding first racks 8, the two connection plates 4 can be controlled to respectively drive the corresponding Z-axis guide rail assemblies 2 to move horizontally in the direction of the X-axis guide rail assembly 1. This further enables the two Z-axis guide rail assemblies 2, the Y-axis guide rail assembly 3, the printer frame 11, and the printer device to move horizontally forward or backward along the direction of the X-axis guide rail assembly 1. By starting the two third servo motors 20 to rotate forward, the two third servo motors 20 can respectively control the corresponding ball screws 22 to rotate forward, and then control the Y-axis guide rail assembly 3, the printer frame 11, and the printer device to rise vertically along the Z-axis guide rail assembly 2. By starting the two third servo motors 20 to rotate reverse, the two third servo motors 20 can respectively control the corresponding ball screws 22 to rotate reverse, and then control the Y-axis guide rail assembly 3, the printer frame 11, and the printer device to fall vertically along the Z-axis guide rail assembly 2. By starting the second servo motor 12 to rotate forward or reverse, the second servo motor 12 drives the second drive gear 13 to rotate. By using the meshing transmission of the second drive gear 13 and the second rack 14, the printer frame 11 and the printer device can be controlled to move horizontally along the Y-axis guide rail assembly 3. This can realize the precise adjustment of the printing position of the printer device, make the printing operation more convenient, improve the printing effect and printing quality. Meanwhile, the content not described in detail in this specification is the existing technology known to the skilled person in this field.

In summary, this ground rail type printer offers enhanced maneuverability for the printer device mounted on the printer frame 11. Based on the specific printing requirements, adjustments can be efficiently carried out along the directional orientations of the X-axis guide rail assembly 1, Z-axis guide rail assembly 2, and Y-axis guide rail assembly 3. The printer's design lends itself to exceptional precision in fine-tuning the printing position of the printer device. Additionally, it significantly extends the scope of adjustments, simplifies the printing operation, and ultimately elevates both the effectiveness and the quality of the printing output.

The invention claimed is:
1. A ground rail type printer, comprising two X-axis guide rail assemblies (1), two Z-axis guide rail assemblies, and a Y-axis guide rail assembly (3), characterized in that: both X-axis guide rail assemblies (1) have a connecting plate (4) installed by sliding;
the bottom ends of the two Z-axis guide rail assemblies (2) are respectively installed on tops of the corresponding connecting plates (4) by screws;
a first rack (8) is installed on the sides of the two X-axis guide rail assemblies (1) that are closest to each other;
both connecting plates (4) are equipped with X-axis drive assemblies;
sliding supports (21) are installed by sliding on the two Z-axis guide rail assemblies (2);
two ends of the Y-axis guide rail assembly (3) are respectively fixedly connected to the corresponding sliding supports (21);
the Y-axis guide rail assembly (3) has a printer frame (11) installed by sliding;
the printer frame (11) is equipped with a Y-axis drive assembly;
fixed supports (19) are installed on the tops of the two Z-axis guide rail assemblies (2); and
the two Z-axis guide rail assemblies (2) are equipped with Z-axis drive assemblies;
wherein both X-axis drive assemblies comprise a first servo motor (5), a drive shaft (6), and a first drive gear (7);
the first servo motor (5) is fixedly installed on the top of a corresponding connecting plate (4);

the drive shaft (6) is rotatably installed on the corresponding connecting plate (4);

the top end of the drive shaft (6) penetrates the corresponding connecting plate (4) and is fixedly connected to an output shaft end of the first servo motor (5); and the first drive gear (7) is fixedly installed at the bottom end of the drive shaft (6); and the first drive gear (7) meshes with the first rack (8).

2. The ground rail type printer according to claim 1, characterized in that:

the bottom of the connecting plate (4) has two support rollers (9) installed by rotation; the two support rollers (9) are symmetrically set on both sides of the drive shaft (6); and the two support rollers (9) are both in rolling contact with a top of one of the X-axis guide rail assemblies (1).

3. The ground rail type printer according to claim 1, characterized in that:

the bottom of the two X-axis guide rail assemblies (1) is each installed with multiple channel steel brackets (10) by screws; and the multiple channel steel brackets (10) at the bottom of each respective X-axis guide rail assembly (1) are arranged at equal intervals.

4. The ground rail type printer according to claim 1, characterized in that:

the Y-axis drive assembly comprises a second servo motor (12), a second drive gear (13), and a second rack (14);

the second servo motor (12) is fixedly installed on the left side of the printer frame (11);

the second drive gear (13) is fixedly installed at an output shaft end of the second servo motor (12);

the second rack (14) is fixedly installed on the side of the printer frame (11) that is close to the second servo motor (12); and the second drive gear (13) meshes with the second rack (14).

5. The ground rail type printer according to claim 1, characterized in that:

the printer frame (11) comprises two fixed plates (15), four screws (16), four positioning rings (17), and two guide wheels (18);

the two fixed plates (15) are respectively located on both sides of the Y-axis guide rail assembly (3);

the two ends of the screws (16) are installed on the corresponding fixed plates (15) by nuts;

the four positioning rings (17) are respectively set on the corresponding screws (16);

the two guide wheels (18) are rotatably installed on the sides of the two fixed plates (15) that are farthest from each other; and the two guide wheels (18) are respectively in rolling contact with the two sides of the Y-axis guide rail assembly (3).

6. The ground rail type printer according to claim 1, characterized in that:

both Z-axis drive assemblies comprise a third servo motor (20), a ball screw (22), a ball nut (23), and a coupling (24);

both the third servo motor (20) and the coupling (24) are fixedly installed on the top of a fixed support (19);

the ball screw (22) is rotatably installed on a corresponding Z-axis guide rail assembly (2);

an output shaft end of the third servo motor (20) and the top end of the ball screw (22) are respectively connected to the coupling (24);

the sliding support (21) is threadedly connected to the ball screw (22); and the ball nut (23) is installed on the sliding support (21) and is set on the ball screw (22).

7. The ground rail type printer according to claim 6, characterized in that:

the top of the Z-axis guide rail assembly (2) has two U-shaped support plates (25) installed by screws;

the two U-shaped support plates (25) are symmetrically set on both sides of the third servo motor (20);

the inside of each U-shaped support plate (25) has two pins (26) installed by screws;

the two pins (26) are respectively installed with two roller wheels (27) by rotation; the two sides of the Z-axis guide rail assemblies (2) that are farthest from each other are equipped with counterweight assemblies (28).

* * * * *